(12) United States Patent
Zhang et al.

(10) Patent No.: US 9,230,588 B2
(45) Date of Patent: Jan. 5, 2016

(54) MAGNETIC RECORDING MEDIUM AND MAGNETIC STORAGE APPARATUS

(71) Applicant: SHOWA DENKO K.K., Tokyo (JP)

(72) Inventors: Lei Zhang, Chiba (JP); Tetsuya Kanbe, Chiba (JP); Yuji Murakami, Chiba (JP); Kazuya Niwa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 30 days.

(21) Appl. No.: 14/326,555

(22) Filed: Jul. 9, 2014

(65) Prior Publication Data

US 2015/0029830 A1    Jan. 29, 2015

(30) Foreign Application Priority Data

Jul. 26, 2013   (JP) .................................. 2013-155779

(51) Int. Cl.
*G11B 5/73* (2006.01)
*G11B 5/65* (2006.01)
*G11B 5/00* (2006.01)

(52) U.S. Cl.
CPC ................ *G11B 5/65* (2013.01); *G11B 5/7325* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,068,739 A | 5/2000 | Suzuki et al. | |
| 2004/0161638 A1* | 8/2004 | Maeda | G11B 5/65 428/832 |
| 2006/0280973 A1* | 12/2006 | Sun | C23C 14/024 428/831.2 |
| 2007/0071964 A1* | 3/2007 | Noda | B82Y 30/00 428/323 |
| 2009/0136782 A1* | 5/2009 | Lu | G11B 5/732 428/828 |
| 2012/0085628 A1* | 4/2012 | Pearce | H02B 11/127 200/50.24 |
| 2012/0307398 A1* | 12/2012 | Kanbe | G11B 5/65 360/75 |
| 2014/0072828 A1* | 3/2014 | Inaba | G11B 5/645 428/831 |
| 2014/0308542 A1* | 10/2014 | Zhang | G11B 5/7325 428/831.2 |
| 2015/0213823 A1* | 7/2015 | Uchida | G11B 5/65 428/846.9 |

FOREIGN PATENT DOCUMENTS

| | | |
|---|---|---|
| JP | H11-353648 | 12/1999 |
| JP | 2009-158054 | 7/2009 |
| JP | 2012-048792 | 3/2012 |

OTHER PUBLICATIONS

En Yang et al., "$L1_0$ FePt-oxide columnar perpendicular media with high coercivity and small grain size", Journal of Applied Physics 104, 023904 (2008).

* cited by examiner

*Primary Examiner* — Kevin Bernatz
(74) *Attorney, Agent, or Firm* — IPUSA, PLLC

(57) ABSTRACT

A magnetic recording medium includes a substrate, a magnetic layer including an alloy having an $L1_0$ type crystal structure as a main component thereof, a plurality of underlayers arranged between the substrate and the magnetic layer, and a barrier layer made of a material having an NaCl structure. The plurality of underlayers include at least one crystalline underlayer including Mo as a main component thereof, and at least one of Si and C in a range of 1 mol % to 20 mol % and an oxide in a range of 1 vol % to 50 vol %. The barrier layer is provided between the magnetic layer and the at least one crystalline underlayer including Mo.

12 Claims, 3 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of Japanese Patent Application No. 2013-155779 filed on Jul. 26, 2013, the entire contents of which are incorporated herein by reference.

BACKGROUND OF THE INVENTION

1. Field of the Invention

The present invention relates to a magnetic recording medium and a magnetic storage apparatus.

2. Description of the Related Art

Recently, demands to increase storage capacities of HDDs (Hard Disk Drives) are increasing. As one means of satisfying such demands, a heat-assisted recording method has been proposed. The heat-assisted recording method performs recording with respect to a magnetic recording medium using a magnetic head mounted with a laser light source, by heating the magnetic recording medium by the magnetic head.

The heat-assisted recording method can reduce the coercivity of the magnetic recording medium by heating the magnetic recording medium and enable use of a magnetic material having a high crystal magnetic anisotropy constant Ku (hereinafter also referred to as a "high-Ku material") for a magnetic layer of the magnetic recording medium. For this reason, the magnetic grain size of the magnetic layer can be reduced while maintaining thermal stability, and a surface recording density on the order of 1 Tbits/inch$^2$ can be achieved. The high-Ku material includes ordered alloys, such as $L1_0$ type FePt alloys, $L1_0$ type CoPt alloys, $L1_1$ type CoPt alloys, or the like.

In addition, in order to isolate (or separate) crystal grains of the ordered alloy, the magnetic layer is added with a grain boundary material, such as an oxide including $SiO_2$, $TiO_2$, or the like, or C, BN, or the like. By employing a granular structure in which the magnetic crystal grains are separated at the grain boundary, an exchange coupling between the magnetic grains is reduced compared to a case in which the grain boundary material is not added, and a high medium SNR (Signal-to-Noise Ratio) can be achieved.

For example, En Yang et al., "$L1_0$ FePt-oxide columnar perpendicular media with high coercivity and small grain size", Journal of Applied Physics 104, 023904 (2008) propose adding 38% $SiO_2$ to FePt, in order to reduce the magnetic grain diameter to 5 nm. Japanese Laid-Open Patent Publication No. 11-353648 also describes that the magnetic grain diameter can further be reduced to 2.9 nm by increasing the added content of $SiO_2$ to 50%.

In order to obtain a magnetic recording medium having a high perpendicular magnetic anisotropy and employing the heat-assisted recording method, the $L1_0$ type ordered alloy within the magnetic layer preferably has a good (001) orientation. Because the orientation of the magnetic layer can be controlled by an underlayer, a suitable underlayer is required to make the $L1_0$ type ordered alloy within the magnetic layer to have the good (001) orientation.

For example, Japanese Laid-Open Patent Publication No. 11-353648 describes that the good (001) orientation of the $L1_0$ type ordered alloy within the magnetic layer can be achieved using a MgO underlayer.

In addition, Japanese Laid-Open Patent Publication No. 2009-158054, for example, describes that the (001) orientation of the $L1_0$ type FePt magnetic layer can further be improved by forming, on a crystal grain control layer made of a Cr—Ti—B alloy or the like having a bcc (body centered cubic) structure, a MgO intermediate layer that achieves both crystal orientation control and low heat conduction.

For example, Japanese Laid-Open Patent Publication No. 2012-048792 describes an example in which Mo-5 at % Mo/Co is used for the underlayer.

In a magnetic storage apparatus that uses the magnetic recording medium employing the heat-assisted recording method, there are demands to simultaneously reduce the magnetic crystal grain size of the magnetic recording medium and sufficiently reduce the exchange coupling between the magnetic crystal grains, in order to further improve the medium SNR. As described above, adding the grain boundary material described above, such as $SiO_2$, C, or the like, to the magnetic layer, is effective in satisfying these demands.

On the other hand, a microwave-assisted recording method has been proposed as the next-generation recording method. The microwave-assisted recording method performs recording on the magnetic recording medium by applying a high-frequency magnetic field from the magnetic head to the magnetic layer so as to tilt a magnetization direction from an axis of easy magnetization, in order to locally switch the magnetization of the magnetic layer and record magnetic information.

Similarly as in the case of the heat-assisted recording method, the microwave-assisted recording method can use a high-Ku material, such as the $L1_0$ type alloy, for the magnetic layer of the magnetic recording medium. The magnetic grain diameter of the magnetic layer needs to be further reduced in order to further improve the recording density. For this reason, the microwave-assisted recording method also requires the $L1_0$ type alloy, so that the magnetic grain size of the magnetic layer can be reduced while maintaining thermal stability.

However, when a large amount of the grain boundary material is added in order to obtain a sufficiently high medium SNR in the magnetic storage apparatus, ordering of the crystal grains (hereinafter also referred to as "magnetic layer crystal grains") of the $L1_0$ type alloy included in the magnetic layer, such as the crystal trains of the FePt alloy, for example, deteriorates, to thereby deteriorate the crystal magnetic anisotropy constant Ku.

SUMMARY OF THE INVENTION

Embodiments of the present invention may provide a magnetic recording medium employing the heat-assisted recording method or the microwave-assisted recording method, and a magnetic storage apparatus including such a magnetic recording medium, which can improve the medium SNR without deteriorating the ordering of crystal grains forming an $L1_0$ type alloy included in a magnetic layer.

According to one aspect of the embodiment, a magnetic recording medium may include a substrate, a magnetic layer including an alloy having an $L1_0$ type crystal structure as a main component thereof, a plurality of underlayers arranged between the substrate and the magnetic layer, and a barrier layer made of a material having an NaCl structure, wherein the plurality of underlayers include at least one crystalline underlayer including Mo as a main component thereof, and at least one of Si and C in a range of 1 mol % to 20 mol % and an oxide in a range of 1 vol % to 50 vol %, and wherein the barrier layer is provided between the magnetic layer and the at least one crystalline underlayer including Mo.

According to another aspect of the embodiment, a magnetic storage apparatus may include the magnetic recording medium described above, and a head configured to write information on and read information from the magnetic recording medium.

Other objects and further features of the present invention will be apparent from the following detailed description when read in conjunction with the accompanying drawings.

DESCRIPTION OF THE PREFERRED EMBODIMENTS

Figure 1:
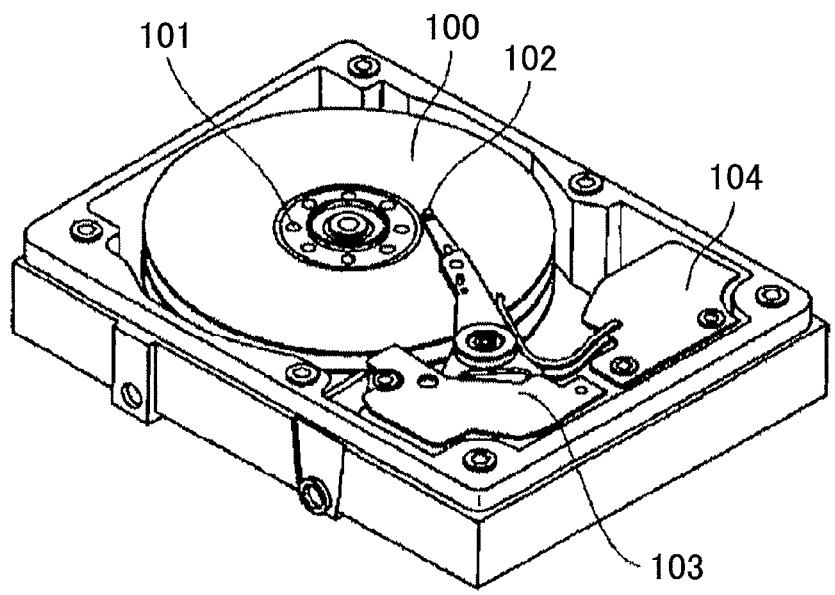
FIG. 1 is a perspective view schematically illustrating a configuration of an example of a magnetic storage apparatus in a second embodiment of the present invention.

A description will be given of a magnetic recording medium and a magnetic storage apparatus in each embodiment of the present invention, by referring to the drawings. The present invention is not limited to the described embodiments, and various variations, modification, and substitutions may be made without departing from the scope of the present invention.

First Embodiment

A description will be given of a configuration of an example of a magnetic recording medium in this embodiment.

The magnetic recording medium in this embodiment includes a substrate, a magnetic layer including an alloy having an $L1_0$ type crystal structure as a main component thereof, and a plurality of underlayers arranged between the substrate and the magnetic layer. Amongst the plurality of underlayers, at least one underlayer may be crystalline and include Mo.

The underlayer including Mo may include a crystalline alloy including Mo as a main component thereof. This crystalline alloy preferably has a bcc (body centered cubic) structure and includes at least one of Si and C in a range of 1 mol % to 20 mol % and an oxide in a range of 1 vol % to 50 vol %.

A barrier layer made of a material having an NaCl structure may be formed between the magnetic layer and the crystalline underlayer including Mo.

In other words, the magnetic recording medium in this embodiment includes the substrate, the plurality of underlayers provided on the substrate, and the magnetic layer, and may additionally include the barrier layer provided between the magnetic layer and the crystalline underlayer including Mo.

The substrate is not limited to a particular substrate material. For example, a glass substrate or the like, suited for the magnetic recording medium, may be used for the substrate.

The plurality of underlayers are provided on the substrate, and at least one of the plurality of underlayers is the crystalline underlayer including Mo.

In this embodiment, the crystalline underlayer including Mo may include one or more elements selected from a group consisting of Si and C, where the content (or added amount) of the one or more selected elements is in the range of 1 mol % to 20 mol %. This range is preferable for the added element because the orientation of the underlayer to a (100) plane deteriorates when the content (or added amount) exceeds 20 mol %. In addition, this range is preferable for the added element because the effects of adding the one or more elements selected from the group consisting of Si and C cannot be sufficiently exhibited by the added element when the content (or added amount) is less than 1 mol %.

In this embodiment, the crystalline underlayer including Mo may include an oxide in the range of 1 vol % to 50 vol %. This range is preferable for the added oxide because the orientation of the underlayer to the (100) plane deteriorates when the content (or added amount) exceeds 50 vol %. In addition, this range is preferable for the added oxide because the effects of adding the oxide cannot be sufficiently exhibited by the added oxide when the content (or added amount) is less than 1 vol %.

In this embodiment, the crystalline underlayer including Mo preferably includes one or more elements selected from a group consisting of $B_2O_3$, $SiO_2$, $Cr_2O_3$, $Al_2O_3$, $Ta_2O_5$, $Nb_2O_5$, $ZrO_2$, $Y_2O_3$, $CeO_2$, $MnO$, $TiO_2$, $TiO$, $ZnO$, $La_2O_3$, $NiO$, $FeO$, and $CoO$.

In the case in which the crystalline underlayer including Mo includes the oxide, a volume content (vol %) of the oxide may be computed from a molar concentration (mol %), a density $\rho$ (g/cc), and a molecular weight M (g/mol) of each material included in the crystalline underlayer including Mo. The density $\rho$ and the molecular weight M of the material may be obtained from data illustrated in "CRC Handbook of Chemistry and Physics", 93rd Edition, published Jun. 22, 2012 by CRC Press, for example. When adding an oxide A to Mo (molybdenum), the volume content (vol %) of the oxide A may be represented by the following formula (1). In the formula (1), $C_{Mo}$, $\rho_{Mo}$, and $M_{Mo}$ respectively denote the molar concentration, the density, and the molecular weight of Mo. In addition, $C_A$, $\rho_A$, and $M_A$ respectively denote the molar concentration, the density, and the molecular weight of the oxide A.

$$\text{(Volume Content of Oxide } A) = (\rho_{Mo} \cdot C_A \cdot M_A) / (C_{Mo} \cdot M_{Mo} \cdot \rho_A + C_A \cdot M_A \cdot \rho_{Mo}) \quad (1)$$

In an example in which 10 mol % of $Cr_2O_3$ is added to Mo (molybdenum), the volume content (vol %) of $Cr_2O_3$ computed from the formula (1) above becomes 24.5 vol %. An underlayer including W, confirmed by EDS (Energy Dispersive x-ray Spectroscopy) to include 10 mol % of $Cr_2O_3$, includes approximately 24 vol % of $Cr_2O_3$ as confirmed by observation made using a TEM (Transmission Electron Microscope). Hence, it is confirmed that the theoretical value that is computed and the actual measured value are approximately the same for the volume content (vol %) of $Cr_2O_3$.

The magnetic layer including crystal grains of an FePt alloy or the like having the $L1_0$ crystal structure is formed on the underlayer. However, in a case in which the crystal grain diameter of the underlayer is large, a plurality of crystal grains of the alloy having the $L1_0$ crystal structure and included in the magnetic layer grow on one crystal grain of the underlayer. For this reason, in the conventional magnetic recording medium, the individual crystal grain diameters of the alloy having the $L1_0$ crystal structure and included in the magnetic layer become non-uniform, and a crystal grain diameter distribution becomes large. On the other hand, in the magnetic recording medium in this embodiment employing the heat-assisted recording method, the crystal grain diameter of the underlayer can be made small by providing the crystalline underlayer including Mo. By making the crystal grain diameter of the underlayer small, one crystal grain of the magnetic layer grows on one crystal grain of the underlayer, and the so-called one-to-one growth is promoted. As a result, the crystal grain diameters of the alloy having the $L1_0$ crystal structure and included in the magnetic layer can be made uniform. In other words, the crystal grain diameter distribution of the alloy having the $L1_0$ crystal structure and included in the magnetic layer can be made small. At the same time, the medium SNR can be reduced when the magnetic recording medium is provided in the magnetic storage apparatus. In the magnetic recording medium in this embodiment employing the heat-assisted recording method, the provision of the underlayer having the configuration described above can also reduce coercivity distribution, promote isolation (or separation) of the magnetic crystal grains of the magnetic layer, and reduce exchange coupling of the magnetic crystal grains. In addition, the provision of the underlayer having the configuration described above can reduce SDF (Switching Field Distribution).

The Mo-content of the crystalline underlayer including Mo is not limited to a particular value, however, the Mo-content that is added preferably makes Mo the main component of the crystalline underlayer. For example, an element having a largest content in Si, C, Mo compound excluding oxides, or a material in which Mo is doped with another element, is preferably Mo. Particularly in the case of the Mo compound excluding oxides, the Mo-content is preferably 30 at % or higher, and more preferably 90 at % or higher. Mo does not need to be included by itself in the crystalline underlayer including Mo, and Mo may be doped with another element, or Mo may take the form of the Mo compound described above.

In order to stabilize the performance of the magnetic recording medium employing the heat-assisted recording method, a lattice mismatch (or misfit) amongst the plurality of underlayers is preferably 10% or lower. The crystalline underlayer including Mo may further include one or more elements selected from a group consisting of Cr, Ti, Ta, Nb, and V, in order to adjust the lattice mismatch. In a case in which the crystalline underlayer including Mo includes one or more elements selected from a group consisting of Cr, Ti, Ta, Nb, and V, a content of the one or more elements is not limited to a particular value, and the content may be selected to suitably adjust the lattice mismatch.

In order to orient the crystalline underlayer including Mo to have the (100) orientation of the bcc structure, an orientation control underlayer is preferably provided under the crystalline underlayer including Mo. The orientation control underlayer is not limited to a particular material or configuration. For example, the orientation control underlayer may be formed by a layer including Cr (or Cr metal) having the bcc structure, or a layer including Cr as a main component thereof and having the bcc structure, or a layer including one or more alloys (or metals) selected from a group of alloys (or metals) having a B2 structure.

Examples of the alloy having the bcc structure and including Cr as the main component thereof, used for the orientation control layer, include CrMn, CrMo, CrW, CrV, CrTi, CrRu, or the like. In addition, B, Si, C, or the like may be added to such an alloy, in order to further improve the crystal grain size, distribution, or the like of the orientation control underlayer. However, when adding an element such as B, Si, C, or the like to the alloy, the element is preferably added within a content range such that the (100) orientation of the orientation control underlayer itself does not deteriorate. Moreover, examples of the alloy having the B2 structure, used for the orientation control layer, include RuAl, NiAl, or the like.

Next, a description will be given of the magnetic layer of the magnetic recording medium in this embodiment.

The material used for the magnetic layer is not limited to a particular material. Because the magnetic layer is required to have a high crystal magnetic anisotropy constant Ku, the high-Ku material preferably includes as a main component thereof an alloy having the $L1_0$ crystal structure. Examples of the alloy having the $L1_0$ crystal structure include FePt alloys, CoPt alloys, or the like.

In order to promote the above described ordering of the magnetic layer at the time of forming the magnetic layer, a heat treatment is preferably carried out. A heating temperature (or ordering temperature) of this heat treatment may be reduced by adding an element such as Ag, Au, Cu, Ni, or the like to the alloy having the $L1_0$ crystal structure. The addition of such elements to the alloy having the $L1_0$ crystal structure can reduce the heating temperature (or substrate temperature) at the time of forming the magnetic layer to a temperature within a range of approximately 400° C. to approximately 500° C., for example.

In addition, in the magnetic layer, the crystal grains of the alloy having the $L1_0$ crystal structure are preferably magnetically isolated (or separated). For this reason, the magnetic layer preferably includes one or more materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN. By including one or more such materials in the magnetic layer, the crystal grains are magnetically isolated in a more positive manner, the exchange coupling between the crystal grains are more positively reduced, and the medium SNR can further be improved.

In order to promote the ordering of the magnetic layer having the $L1_0$ crystal structure, a heat treatment that heats to approximately 600° C. is preferably carried out at the time of forming the magnetic layer of the magnetic recording medium employing the heat-assisted recording method. In order to suppress diffusion at a boundary between the underlayer and the magnetic layer, the barrier layer made of the material having the NaCl structure is preferably provided between the magnetic layer and the crystalline underlayer including Mo.

The material having the NaCl structure used for the barrier layer is not limited to a particular material. For example, the material having the NaCl structure used for the barrier layer may include one or more compounds selected from a group consisting of MgO, TiO, NiO, TiN, TiC, TaN, HfN, NbN, ZrC, HfC, TaC, and NbC.

The magnetic recording medium in this embodiment, having the layer structure described above and employing the heat-assisted recording method, may include additional layers, if necessary. For example, the magnetic recording medium preferably includes a DLC (Diamond-Like Carbon) protection layer provided on the magnetic layer.

A method of forming the DLC protection layer is not limited to a particular method. For example, an RF-CVD (Radio Frequency-Chemical Vapor Deposition) method, an IBD (Ion Beam Deposition) method, an FCVA (Filtered Cathodic Vacuum Arc) method, or the like may be used to form the DLC protection layer. The RF-CVD method may deposit the DLC protection layer by decomposing a source gas including hydrocarbon by high-frequency plasma. The IBD method may deposit the DLC protection layer by ionizing a source gas by electrons emitted from a filament. The FCVA method may deposit the DLC protection layer using a solid carbon (C) target, without the use of a source gas.

A thickness of the DLC protection layer is not limited to a particular thickness, however, the thickness of the DLC protection layer is preferably 1 nm or greater and 6 nm or less, for example. In a case in which the thickness of the DLC layer is less than 1 nm, a floating characteristic of the magnetic head may deteriorate. On the other hand, in a case in which the thickness of the DLC layer is greater than 6 nm, a magnetic spacing becomes large, and the medium SNR may deteriorate.

A lubricant layer made of a fluororesin, such as a perfluoropolyether resin, may be coated on the DLC protection layer.

A heat sink layer is preferably provided to quickly cool the magnetic layer. The heat sink layer may be made of a metal having a high heat conductivity, such as Ag, Cu, Al, Au, or the like, or made of an alloy including, as a main component thereof, a metal having a high heat conductivity, such as Ag, Cu, Al, Au, or the like. According to the heat-assisted recording method, the magnetic layer of the magnetic recording medium is heated by laser and quickly cooled thereafter, and it is preferable to suppress spreading of a heated spot. For this reason, the provision of the heat sink layer is preferable in that a width of a magnetic transition region can be reduced, and the medium noise can be reduced. A location where the heat sink layer is provided is not limited to a particular location. For example, the heat sink layer may be provided under the orientation control underlayer, or between the orientation control underlayer and the barrier layer.

In addition, a soft magnetic underlayer may be provided in order to improve a write characteristic. A material used for the soft magnetic underlayer is not limited to a particular material. For example, the soft magnetic underlayer may be made of an amorphous alloy, such as CoTaZr, CoFeTaB, CoFeTaSi, CoFeTaZr, or the like, a microcrystalline alloy, such as FeTaC, FeTaN, or the like, and a polycrystalline alloy, such as NiFe, or the like. The soft magnetic underlayer may be formed by a single layer of such alloys, or have a stacked multi-layer structure in which two layers of such alloys are antiferromagnetically coupled via an Ru layer having a suitable thickness.

Other layers, such as a seed layer, a bonding layer, or the like may be additionally provided, if necessary.

According to the magnetic recording medium in this embodiment employing the heat-assisted recording method, the magnetic layer is provided on a predetermined underlayer, so that the medium SNR of the magnetic storage apparatus using the magnetic recording medium can be improved, without deteriorating the ordering of the crystal grains of the alloy having the $L1_0$ crystal structure included in the magnetic layer.

Second Embodiment

Next, a description will be given of an example of a configuration of the magnetic storage apparatus in a second embodiment. In this embodiment, it is assumed for the sake of convenience that the magnetic storage apparatus employs the heat-assisted recording method, however, the recording method employed in the magnetic storage apparatus is not limited to the heat-assisted recording method. The magnetic recording medium in the first embodiment described above may be used in the magnetic storage apparatus employing the microwave-assisted recording method.

The magnetic storage apparatus in this embodiment may include the magnetic recording medium in the first embodiment described above.

The magnetic storage apparatus may include, for example, a medium drive unit configured to rotate the magnetic recording medium, and a magnetic head having a near-field light generating element on a tip end part thereof. The magnetic storage apparatus may further include a laser generating unit configured to heat the magnetic recording medium, a waveguide configured to guide laser light emitted from the laser generating unit to the near-field light generating element, a head drive unit configured to move the magnetic head, and a signal processing system to process signals to be recorded on the magnetic recording medium and signals reproduced from the magnetic recording medium by the magnetic head.

FIG. 1 is a perspective view schematically illustrating a configuration of an example of the magnetic storage apparatus in the second embodiment of the present invention. The magnetic storage apparatus in this embodiment may have the configuration illustrated in FIG. 1. More particularly, the magnetic storage apparatus may include a magnetic recording medium 100 employing the heat-assisted recording method, a medium drive unit 101 that rotates the magnetic recording medium 100, a magnetic head 102, a head drive unit 103 that moves the magnetic head 102, and a signal processing system 104 that processes signals to be recorded on the magnetic recording medium 100 and signals reproduced from the magnetic recording medium 100 by the magnetic head 102.

Figure 2:
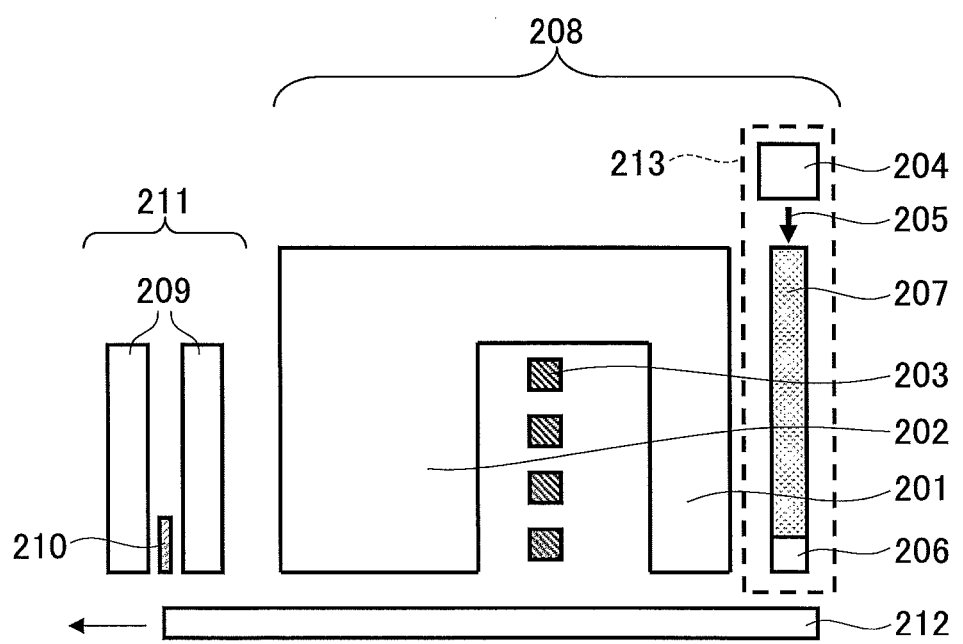
FIG. 2 is a diagram illustrating a configuration of an example of a magnetic head in the second embodiment of the present invention.

FIG. 2 is a diagram illustrating a configuration of an example of the magnetic head in the second embodiment of the present invention. A heat-assisted recording head illustrated in FIG. 2 may be used for the magnetic head 102 illustrated in FIG. 1. The heat-assisted recording head includes a recording head 208 and a reproducing head 211. The recording head 208 includes a main magnetic pole 201, an auxiliary magnetic pole 202, a coil 203 that generates a magnetic field, a laser diode (LD) 204 that forms a laser generating unit, and a waveguide 207 that guides laser light 205 generated from the laser diode 204 to a near-field light generating element 206. The reproducing head 211 includes a reproducing element 210 sandwiched between shields 209.

A magnetic recording medium 212 illustrated in FIG. 2 may be formed by the magnetic recording medium in the first embodiment employing the heat-assisted recording method. Hence, by providing the magnetic layer on the predetermined underlayer, the medium SNR of the magnetic storage apparatus using the magnetic recording medium can be improved, without deteriorating the ordering of the crystal grains of the alloy having the $L1_0$ crystal structure included in the magnetic layer. In addition, the magnetic storage apparatus can obtain a good overwrite characteristic.

Practical Examples

Next, a description will be given of practical examples of the present invention. However, the present invention is not limited to these practical examples which are merely examples.

Practical Examples Emb1-1 Through Emb1-12 and Comparison Example Cmp1-1

Figure 3:
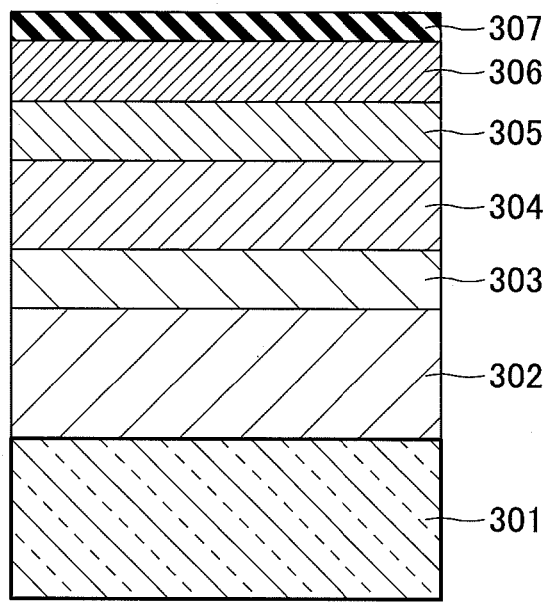
FIG. 3 is a cross sectional view schematically illustrating a layer structure of a magnetic recording medium according to practical examples emb1.

FIG. 3 is a cross sectional view schematically illustrating a layer structure of a magnetic recording medium fabricated in accordance with practical examples Emb1. Practical examples Emb1-1 through Emb1-12 and a comparison example Cmp1-1 are fabricated in the following manner.

A seed layer 302 made of Ni-35 at % Ta and having a thickness of 25 nm is formed on a 2.5-inch (diameter) glass substrate 301, and a substrate heating process (or heat treatment) is performed at 300° C. An orientation control underlayer 303 made of Ru-50 at % Al and having a thickness of 20 nm is formed on the seed layer 302. Next, a crystalline underlayer 304 including Mo and having a thickness of 15 nm is formed on the orientation control underlayer 303. A barrier layer 305 made of MgO and having a thickness of 2 nm is formed on the crystalline underlayer 304. Thereafter, a substrate heating process (or heat treatment) is performed at 580° C., and a magnetic layer 306 made of (Fe-46 at % Pt)-15 mol % $SiO_2$ and having a thickness of 8 nm is formed on the barrier layer 305, and a protection layer 307 made of DLC and having a thickness of 3 nm is formed on the magnetic layer 306.

The crystalline underlayer 304 including Mo has a different composition depending on the practical examples Emb1-1 through Emb1-12, as illustrated in Table 1.

TABLE 1

| | UNDERLAYER INCLUDING Mo | Hc (kOe) | <D> | s/<D> |
|---|---|---|---|---|
| Emb1-1 | Mo—10 mol % Si | 38.4 | 6.1 | 0.20 |
| Emb1-2 | Mo—10 mol % C | 39.0 | 6.2 | 0.21 |
| Emb1-3 | Mo—25 vol % $B_2O_3$ | 38.1 | 6.4 | 0.21 |
| Emb1-4 | Mo—26 vol % $SiO_2$ | 40.1 | 6.8 | 0.17 |
| Emb1-5 | Mo—26 vol % $CeO_2$ | 40.9 | 6.1 | 0.18 |
| Emb1-6 | Mo—26 vol % TiO | 38.3 | 6.1 | 0.18 |
| Emb1-7 | Mo—26 vol % $ZrO_2$ | 39.4 | 6.6 | 0.20 |
| Emb1-8 | Mo—26 vol % $Al_2O_3$ | 40.4 | 6.0 | 0.19 |
| Emb1-9 | Mo—25 vol % $Y_2O_3$ | 39.9 | 6.2 | 0.19 |
| Emb1-10 | Mo—21 vol % NiO | 39.5 | 6.5 | 0.20 |
| Emb1-11 | (Mo—20 at % Ta)—25 vol % $Ta_2O_5$ | 39.2 | 6.6 | 0.17 |
| Emb1-12 | (Mo—20 at % Cr)—26 vol % $Cr_2O_3$ | 39.4 | 6.8 | 0.21 |
| Cmp1-1 | Mo | 31.6 | 6.4 | 0.27 |

The crystalline underlayer 304 including Mo is formed by Mo-10 mol % Si in the practical example Emb1-1, Mo-10 mol % C in the practical example Emb1-2, Mo-25 vol % $B_2O_3$ in the practical example Emb1-3, Mo-26 vol % $SiO_2$ in the practical example Emb1-4, Mo-26 vol % $CeO_2$ in the practical example Emb1-5, Mo-26 vol % TiO in the practical example Emb1-6, Mo-26 vol % $ZrO_2$ in the practical example Emb1-7, Mo-26 vol % $Al_2O_3$ in the practical example Emb1-8, Mo-25 vol % $Y_2O_3$ in the practical example Emb1-9, Mo-21 vol % NiO in the practical example Emb1-10, (Mo-20 at % Ta)-25 vol % $Ta_2O_3$ in the practical example Emb1-11, and (Mo-20 at % Cr)-26 vol % $Cr_2O_3$ in the practical example Emb1-12.

In addition, in the comparison example Cmp1-1, the underlayer 304 is made of Mo but is not added with Si, C, nor an oxide.

Table 1 illustrates a coercivity Hc of each of the practical examples Emb1-1 through Emb1-12 and the comparison example Cmp1-1. The coercivity Hc is obtained from a magnetization curve that is measured at room temperature by applying a magnetic field of 7 T by an SQUID (Superconducting Quantum Interference Device).

From the results illustrated in Table 1, it is confirmed that the coercivity Hc is 38 kOe or higher for each of the practical examples Emb1-1 through Emb1-12, and high compared to the coercivity Hc of 6 kOe for the comparison example Cmp1-1.

Table 1 also illustrates an average grain diameter <D> of the magnetic layer and a grain diameter variance σ/<D> normalized by the average grain diameter <D>, that are obtained by TEM observations, for each of the practical examples Emb1-1 through Emb1-12 and the comparison example Cmp1-1. It is confirmed that the average grain diameter <D> is in a range of 6.0 nm to 6.8 nm for each of the practical examples Emb1-1 through Emb1-12. In addition, it is confirmed that the grain diameter variance σ/<D> normalized by the average grain diameter <D> is 0.21 or less, which is a low value, for each of the practical examples Emb1-1 through Emb1-12. On the other hand, the average grain diameter <D> is 6.4 for the comparison example Cmp1-1, which is approximately the same as those of the practical examples Emb1-1 through Emb1-12. However, the grain diameter variance σ/<D> normalized by the average grain diameter <D> is 0.27 for the comparison example Cmp1-1, which is considerably high compared to those of the practical examples Emb1-1 through Emb1-12.

From the results illustrated in Table 1, it is confirmed that by adding Si, C, or an oxide to the underlayer 304 including Mo, the crystal grain size and the grain size variance of the underlayer 304 are reduced, and that the crystal grain sizes of the FePt alloy within the magnetic layer 306 and having the $L1_0$ crystal structure can be made uniform.

Practical Examples Emb2-1 Through Emb2-12 and Comparison Example Cmp2-1

Figure 4:
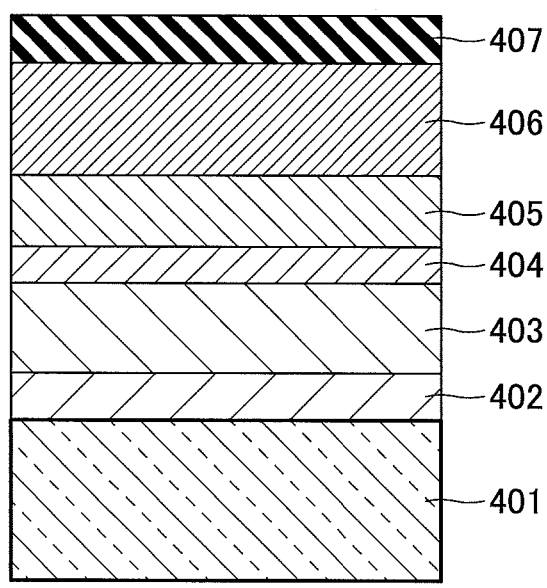
FIG. 4 is a cross sectional view schematically illustrating the layer structure of the magnetic recording medium according to practical examples emb2.

FIG. 4 is a cross sectional view schematically illustrating a layer structure of a magnetic recording medium fabricated in accordance with practical examples Emb2. Practical examples Emb2-1 through Emb2-12 and a comparison example Cmp2-1 are fabricated in the following manner.

A seed layer 402 made of Cr-50 at % Ti and having a thickness of 25 nm is formed on a 2.5-inch (diameter) glass substrate 401, and a substrate heating process (or heat treatment) is performed at 300° C. An orientation control underlayer 403 made of Cr-5 at % Mn and having a thickness of 20 nm is formed on the seed layer 402. Next, a crystalline underlayer 404 including Mo and having a thickness of 20 nm is formed on the orientation control underlayer 403. More particularly, the crystalline underlayer 404 is made of Mo-8 mol % $SiO_2$.

In addition, a barrier layer 405 having a thickness of 2 nm is formed on the crystalline underlayer 404. The barrier layer 405 has a different composition depending on the practical examples Emb2-1 through Emb2-12, as illustrated in Table 2.

TABLE 2

| | BARRIER LAYER | Hc (kOe) |
|---|---|---|
| Emb2-1 | MgO | 41.5 |
| Emb2-2 | TiO | 39.1 |
| Emb2-3 | NiO | 39.4 |
| Emb2-4 | TiN | 38.7 |
| Emb2-5 | TiC | 42.1 |
| Emb2-6 | TaN | 38.7 |
| Emb2-7 | HfN | 39.6 |
| Emb2-8 | NbN | 38.9 |
| Emb2-9 | ZrC | 38.0 |
| Emb2-10 | HfC | 40.3 |
| Emb2-11 | NbC | 40.3 |
| Emb2-12 | TaC | 42.0 |
| Cmp2-1 | — | 19.0 |

The barrier underlayer 405 is formed by MgO in the practical example Emb2-1, TiO in the practical example Emb2-2, NiO in the practical example Emb2-3, TiN in the practical example Emb2-4, TiC in the practical example Emb2-5, TaN in the practical example Emb2-6, HfN in the practical example Emb2-7, NbN in the practical example Emb2-8, ZrC in the practical example Emb2-9, HfC in the practical example Emb2-10, NbC in the practical example Emb2-11, and TaC in the practical example Emb12-12.

In addition, in the comparison example Cmp2-1, no barrier layer is provided.

Thereafter, a substrate heating process (or heat treatment) is performed at 600° C., and a magnetic layer 406 made of (Fe-45 at % Pt)-12 mol % $SiO_2$–6 mol % BN and having a thickness of 10 nm is formed on the barrier layer 405, and a protection layer 407 made of DLC and having a thickness of 3 nm is formed on the magnetic layer 406.

Table 2 illustrates the coercivity Hc of each of the practical examples Emb2-1 through Emb2-12 and the comparison example Cmp2-1, measured in a manner similar to the coercivities Hc illustrated in Table 1. From the results illustrated in Table 2, it is confirmed that the coercivity Hc is 38 kOe or higher for each of the practical examples Emb2-1 through Emb2-12, which is considerably high.

It is also confirmed that the coercivity Hc is 41 kOe or higher, and particularly high for the practical examples Emb2-1, Emb2-5, and Emb2-12 in which the barrier layer 405 is made of MgO, TiC, and TaC, respectively.

On the other hand, in the comparison example Cmp2-1 having no barrier layer 405, it is confirmed that the coercivity Hc is 19 kOe or less, which is considerably low. It may be regarded that because the substrate 401 is heated to 600° C. when forming the magnetic layer 406 for the purposes of promoting the ordering of the magnetic layer 406 having the $L1_0$ crystal structure, the diffusion occurs at the boundary between the crystalline underlayer 404 and the magnetic layer 406, and the magnetic layer 406 cannot sufficiently exhibit the performance thereof.

It is confirmed from the results illustrated in Table 2 that the barrier layer 405 having the NaCl structure is preferably provided between the crystalline underlayer 404 and the magnetic layer 406, in order to suppress diffusion at the boundary between the crystalline underlayer 404 and the magnetic layer 406 when forming the magnetic layer 406 including, as the main component thereof, the alloy having the good ordering and the $L1_0$ crystal structure.

Practical Examples Emb3-1 Through Emb3-6 and Comparison Example Cmp3-1

A magnetic recording medium fabricated in accordance with practical examples Emb3-1 through Emb3-6 and a comparison example Cmp3-1 is fabricated similarly to the practical examples Emb2-1 through Emb2-12 described above, except for the crystalline underlayer 404 including Mo. In the practical examples Emb3-1 through Emb3-6, the crystalline underlayer 404 including Mo is made of (Mo-20 at % Ta)—$SiO_2$ that is added with 1 vol % to 50 vol % of $SiO_2$.

On the other hand, in the comparison example Emb3-1, the crystalline underlayer 404 including Mo is made of Mo-20 at % Ta that is not added with $SiO_2$. Table 3 illustrates the coercivity Hc of each of the practical examples Emb3-1 through Emb3-6 and the comparison example Cmp3-1, measured in a manner similar to the coercivities Hc illustrated in Table 1.

TABLE 3

| | UNDERLAYER INCLUDING Mo | COMPUTED Vol % ($SiO_2$) | Hc (kOe) |
|---|---|---|---|
| Emb3-1 | (Mo—20 at % Ta)—0.4 mol % $SiO_2$ | 1 | 35.8 |
| Emb3-2 | (Mo—20 at % Ta)—5 mol % $SiO_2$ | 13 | 40.4 |
| Emb3-3 | (Mo—20 at % Ta)—10 mol % $SiO_2$ | 24 | 40.7 |
| Emb3-4 | (Mo—20 at % Ta)—15 mol % $SiO_2$ | 33 | 41.9 |
| Emb3-5 | (Mo—20 at % Ta)—20 mol % $SiO_2$ | 41 | 39.7 |
| Emb3-6 | (Mo—20 at % Ta)—26 mol % $SiO_2$ | 50 | 35.3 |
| Cmp3-1 | Mo—20 at % Ta | — | 30.9 |

From the results illustrated in Table 3, it is confirmed that the coercivity Hc is 35 kOe or higher in each of the practical examples Emb3-1 through Emb3-6, and high compared to the coercivity Hc of the comparison example Cmp3-1 in which no $SiO_2$ is added to the crystalline underlayer 404 including Mo. It is also confirmed from these results that when $SiO_2$ is added to the crystalline underlayer 404 including Mo, the $SiO_2$-content that is added is preferably 1 vol % or higher and 50 vol % or lower.

In addition, it is confirmed that the coercivity Hc of the practical examples Emb3-2 through Emb3-5 in which the $SiO_2$-content added to the crystalline underlayer 404 including Mo is 13 vol % or higher and 41 vol % or lower is 39 kOe and considerably high compared to that of the comparison example Cmp3-1.

The effects of adding $SiO_2$ in the practical example Emb3-1 in which the $SiO_2$-content added to the crystalline underlayer 404 including Mo is 1 vol % and the practical example Emb3-6 in which the $SiO_2$-content added to the crystalline underlayer 404 including Mo is 50 vol % are confirmed over the comparison example Cmp3-1, as described above. However, it is also confirmed that the coercivity Hc is approximately 35 kOe for the practical examples Emb3-1 and Emb3-6, and that the performances of the practical examples Emb3-1 and Emb3-6 are not as high as those of the practical examples Emb3-2 through Emb3-5. In the case in which the $SiO_2$-content added to the crystalline underlayer 404 including Mo is 1 vol %, it may be regarded that the reduction of the crystal grain diameter of the underlayer 404 including Mo is insufficient, and the effect of isolating the crystal grains of the FePt alloy having the $L1_0$ crystal structure, included in the magnetic layer 406, is insufficient. On the other hand, in the case in which the $SiO_2$-content added to the crystalline underlayer 404 including Mo is 50 vol %, it may be regarded that the orientation of the underlayer 404 including Mo to the (100) plane deteriorates due to the excessive addition of $SiO_2$.

From these results, it is confirmed that the $SiO_2$-content added to the crystalline underlayer 404 including Mo is preferably 1 vol % or higher and 50 vol % or lower, and more preferably higher than 1 vol % and lower than 50 vol %.

In the practical examples Emb3-1 through Emb3-6, $SiO_2$ is added to the crystalline underlayer 404 including Mo. However, it may be regarded that oxides other than $SiO_2$ will also exhibit similar effects to produce similar performances when added to the crystalline underlayer 404 including Mo. Accordingly, when adding an oxide other than $SiO_2$ to the crystalline underlayer 404 including Mo, the oxide-content that is added is preferably 1 vol % or higher and 50 vol % or lower, and more preferably higher than 1 vol % and lower than 50 vol %.

Practical Examples Emb4-1 Through Emb4-5 and Comparison Example Cmp4-1

A magnetic recording medium fabricated in accordance with practical examples Emb4-1 through Emb4-5 and a comparison example Cmp4-1 is fabricated similarly to the practical examples Emb2-1 through Emb2-12 described above, except for the crystalline underlayer 404 including Mo. In the practical examples Emb4-1 through Emb4-5, the crystalline underlayer 404 including Mo is made of MoSi that is added with 1 mol % to 20 mol % of Si.

On the other hand, in the comparison example Emb4-1, the crystalline underlayer 404 including Mo is made of Mo that is not added with Si. Table 4 illustrates the coercivity Hc of each of the practical examples Emb4-1 through Emb4-5 and the comparison example Cmp4-1, measured in a manner similar to the coercivities Hc illustrated in Table 1.

TABLE 4

| | UNDERLAYER INCLUDING Mo | Hc (kOe) |
|---|---|---|
| Emb4-1 | Mo—1 mol % Si | 36.7 |
| Emb4-2 | Mo—5 mol % Si | 41.5 |
| Emb4-3 | Mo—10 mol % Si | 40.7 |
| Emb4-4 | Mo—15 mol % Si | 39.8 |
| Emb4-5 | Mo—20 mol % Si | 35.8 |
| Cmp4-1 | Mo | 32.0 |

From the results illustrated in Table 4, it is confirmed that the coercivity Hc is 39 kOe or higher in each of the practical examples Emb4-1 through Emb4-5, and high compared to the coercivity Hc of the comparison example Cmp4-1 in which no Si is added to the crystalline underlayer 404 including Mo. It is also confirmed from these results that when Si is added to the crystalline underlayer 404 including Mo, the Si-content that is added is preferably 1 mol % or higher and 20 mol % or lower.

In addition, it is confirmed that the coercivity Hc of the practical examples Emb4-2 through Emb4-4 in which the Si-content added to the crystalline underlayer 404 including Mo is 5 mol % or higher and 15 mol % or lower is 39 kOe and considerably high compared to that of the comparison example Cmp4-1.

The effects of adding Si in the practical example Emb4-1 in which the Si-content added to the crystalline underlayer 404 including Mo is 1 mol % and the practical example Emb4-5 in which the Si-content added to the crystalline underlayer 404 including Mo is 20 mol % are confirmed over the comparison example Cmp4-1, as described above. However, it is also confirmed that the coercivity Hc is 36.7 kOe and 35.8 kOe for the practical examples Emb4-1 and Emb4-5, respectively, and that the performances of the practical examples Emb4-1 and Emb4-5 are not as high as those of the practical examples Emb4-2 through Emb4-4. In the case in which the Si-content added to the crystalline underlayer 404 including Mo is 1 mol %, it may be regarded that the reduction of the crystal grain diameter of the underlayer 404 including Mo is insufficient, and the effect of isolating the crystal grains of the FePt alloy having the $L1_0$ crystal structure, included in the magnetic layer 406, is insufficient. On the other hand, in the case in which the Si-content added to the crystalline underlayer 404 including Mo is 20 mol %, it may be regarded that the orientation of the underlayer 404 including Mo to the (100) plane deteriorates due to the excessive addition of Si.

From these results, it is confirmed that the Si-content added to the crystalline underlayer 404 including Mo is preferably 1 mol % or higher and 20 mol % or lower, and more preferably higher than 1 mol % and lower than 20 mol %.

In the practical examples Emb4-1 through Emb4-5, Si is added to the crystalline underlayer 404 including Mo. However, it may be regarded that elements other than Si, such as C, will also exhibit similar effects to produce similar performances when added to the crystalline underlayer 404 including Mo. Accordingly, when adding at least one of elements selected from a group consisting of Si and C to the crystalline underlayer 404 including Mo, the content that is added is preferably 1 mol % or higher and 20 mol % or lower, and more preferably higher than 1 mol % and lower than 20 mol %.

Practical Examples Emb5-1 Through Emb5-10 and Comparison Example Cmp5-1

Figure 5:
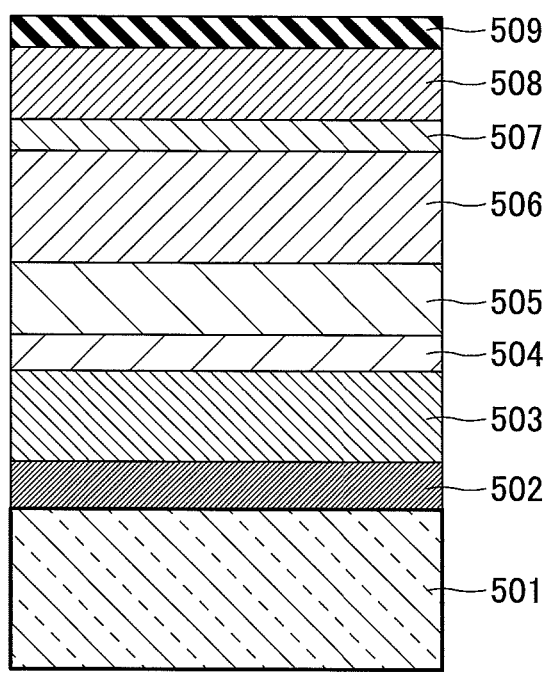
FIG. 5 is a cross sectional view schematically illustrating the layer structure of the magnetic recording medium according to practical examples emb5.

FIG. 5 is a cross sectional view schematically illustrating a layer structure of a magnetic recording medium fabricated in accordance with practical examples Emb5. Practical examples Emb5-1 through Emb5-10 and a comparison example Cmp5-1 are fabricated in the following manner.

A bonding layer 502 made of Cr-50 at % Ti and having a thickness of 10 nm is formed on a 2.5-inch (diameter) glass substrate 401. A heat sink layer 503 made of Cu-0.5 at % Zr and having a thickness of 50 nm is formed on the bonding layer 502. A seed layer 504 made of Cr-50 at % Ti and having a thickness of 10 nm is formed on the bonding layer 502, and a substrate heating process (or heat treatment) is performed at 300° C.

An orientation control underlayer 505 made of Cr-10 at % Ru and having a thickness of 10 nm is formed on the seed layer 504. Next, a crystalline underlayer 506 including Mo and having a thickness of 15 nm is formed on the orientation control underlayer 505. A barrier layer 507 made of MgO and having a thickness of 2 nm is formed on the crystalline underlayer 506. Thereafter, a substrate heating process (or heat treatment) is performed at 600° C., and a magnetic layer 508 made of (Fe-46 at % Pt)-30 mol % C and having a thickness of 8 nm is formed on the barrier layer 507, and a protection layer 508 made of DLC and having a thickness of 3 nm is formed on the magnetic layer 508.

The crystalline underlayer 506 including Mo has a different composition depending on the practical examples Emb5-1 through Emb5-10, as illustrated in Table 5.

TABLE 5

| | UNDERLAYER INCLUDING Mo | SNR (dB) | OW (dB) |
|---|---|---|---|
| Emb5-1 | Mo—8 mol % Si | 15.6 | 31.5 |
| Emb5-2 | (Mo—15 at % Ti)—20 vol % $TiO_2$ | 15.1 | 32.2 |
| Emb5-3 | Mo—20 vol % $SiO_2$ | 16.1 | 31.9 |
| Emb5-4 | (Mo—10 at % Ta)—20 vol % $ZrO_2$ | 16.3 | 31.8 |
| Emb5-5 | Mo—20 vol % $Nb_2O_5$ | 15.9 | 32.9 |
| Emb5-6 | Mo—20 vol % $La_2O_3$ | 15.2 | 31.4 |
| Emb5-7 | Mo—20 vol % CoO | 16.5 | 32.9 |
| Emb5-8 | Mo—20 vol % FeO | 15.9 | 33.1 |
| Emb5-9 | (Mo—15 at % Cr)—20 vol % MnO | 15.9 | 33.0 |
| Emb5-10 | Mo—20 vol % ZnO | 15.9 | 32.7 |
| Cmp5-1 | Mo | 13.5 | 25.9 |

The crystalline underlayer 506 including Mo is formed by Mo-8 mol % Si in the practical example Emb5-1, (Mo-15 at % Ti)-20 vol % $TiO_2$ in the practical example Emb5-2, Mo-20 vol % $SiO_2$ in the practical example Emb5-3, (Mo-10 at % Ta)-20 vol % $ZrO_2$ in the practical example Emb5-4, Mo-20 vol % $Nb_2O_5$ in the practical example Emb5-5, Mo-26 vol % TiO in the practical example Emb5-6, Mo-20 vol % $La_2O_3$ in the practical example Emb5-7, Mo-20 vol % FeO in the practical example Emb5-8, (Mo-15 at % Cr)-16 mol % MnO in the practical example Emb5-9, and Mo-20 vol % ZnO in the practical example Emb5-10.

In addition, in the comparison example Cmp5-1, the underlayer 506 is made of Mo but is not added with Si, C, nor an oxide.

The magnetic recording medium in accordance with each of the practical examples Emb5-1 through Emb5-10 and the comparison example Cmp5-1 is further coated with a perfluoropolyether resin on the DLC protection layer 508, and assembled within the magnetic storage apparatus illustrated in FIG. 1.

As described above in conjunction with FIG. 1, the magnetic storage apparatus includes the magnetic recording medium 100, the medium drive unit 101 that rotates the magnetic recording medium 100, the magnetic head 102, the head drive unit 103 that moves the magnetic head 102, and the signal processing system 104 that processes signals to be recorded on the magnetic recording medium 100 and signals reproduced from the magnetic recording medium 100 by the magnetic head 102.

The heat-assisted recording head illustrated in FIG. 2 is used for the magnetic head 102, in order to evaluate the overwrite (OW) characteristic (or overwrite performance). As described above, the heat-assisted recording head includes the recording head 208 and the reproducing head 211. The recording head 208 includes the main magnetic pole 201, the auxiliary magnetic pole 202, the coil 203 that generates the magnetic field, the laser diode (LD) 204 that forms the laser generating unit, and the waveguide 207 that guides laser light 205 generated from the laser diode 204 to the near-field light generating element 206. The reproducing head 211 includes the reproducing element 210 sandwiched between the shields 209.

The magnetic recording medium 212 can be heated by the near-field light emitted from the near-field light generating element 206, and the information recording onto the magnetic recording medium 212 can be performed in a state in which the coercivity of the magnetic recording medium 212 is reduced to the head magnetic field or less.

Table 5 illustrates the medium SNR and the overwrite characteristic (indicated by "OW" in Table 5) that are measured by writing an all-"0" pattern signal onto the magnetic recording medium 212 by the magnetic head 102 at a linear recording density of 1500 kFCI, in each magnetic storage apparatus assembled with the magnetic recording medium in accordance with each of the practical examples Emb5-1 through Emb5-10 and the comparison example Cmp5-1. The power input to the laser diode 204 is adjusted so that a track width (MWW: Magnetic Write Width) defined as a half-value width of a track profile becomes 60 nm.

From the results illustrated in Table 5, it is confirmed that the medium SNR is 15 dB or higher and the overwrite characteristic is 30 dB or higher, and both considerably high for the practical examples Emb5-1 through Emb5-10. It is also confirmed that the medium SNR is 16 dB or higher, and considerably high, for the practical example Emb5-3 in which the crystalline underlayer 506 including Mo is made of Mo-8 mol % $SiO_2$, the practical example Emb5-4 in which the crystalline underlayer 506 including Mo is made of (Mo-10 at % Ta)-10 mol % $ZrO_2$, and the practical example Emb5-5 in which the crystalline underlayer 506 including Mo is made of W-17 mol % CoO.

On the other hand, it is confirmed that the medium SNR and the overwrite characteristic for the comparison example Cmp5-1 in which the crystalline underlayer 506 including Mo is made of Mo that is not added with other elements, are considerably low compared to those of the practical examples Emb5-1 through Emb5-10.

Accordingly, it is confirmed that a magnetic storage apparatus having a high medium SNR and a good overwrite characteristic is obtainable when the crystalline underlayer including Mo includes Si, C, or an oxide, in addition to Mo.

According to the embodiments and practical examples described above, it is possible to provide a magnetic recording medium employing the heat-assisted recording method or the microwave-assisted recording method, and a magnetic storage apparatus including such a magnetic recording medium, which can improve the medium SNR without deteriorating the ordering of the crystal grains forming the $L1_0$ type alloy included in the magnetic layer.

What is claimed is:

1. A magnetic recording medium comprising:
   a substrate;
   a magnetic layer including an alloy having an $L1_0$ type crystal structure as a main component thereof;
   a plurality of underlayers arranged between the substrate and the magnetic layer; and
   a barrier layer made of a material having an NaCl structure,
   wherein the plurality of underlayers include at least one crystalline underlayer including Mo as a main component thereof, and at least one of Si and C in a range of 1 mol % to 20 mol % and an oxide in a range of 1 vol % to 50 vol %, and
   wherein the barrier layer is provided between the magnetic layer and the at least one crystalline underlayer including Mo.

2. The magnetic recording medium as claimed in claim 1, wherein the at least one crystalline underlayer including Mo includes one or more elements selected from a group consisting of $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO.

3. The magnetic recording medium as claimed in claim 1, wherein
   the plurality of underlayers include an orientation control underlayer including Cr or Cr as a main component thereof and having a body centered cubic structure, and
   the at least one crystalline underlayer including Mo is provided on the orientation control underlayer.

4. The magnetic recording medium as claimed in claim 1, wherein
   the plurality of underlayers include an orientation control underlayer having a B2 structure, and
   the at least one crystalline underlayer including Mo is provided on the orientation control underlayer.

5. The magnetic recording medium as claimed in claim 1, wherein the barrier layer is made of one or more compounds selected from a group consisting of MgO, TiO, NiO, TiN, TiC, TaN, HfN, NbN, ZrC, HfC, TaC, and NbC.

6. The magnetic recording medium as claimed in claim 1, wherein the magnetic layer includes an CoPt alloy or an FePt alloy having the $L1_0$ type crystal structure as the main component thereof, and includes one or more materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN.

7. A magnetic storage apparatus comprising:
   a magnetic recording medium; and
   a head configured to write information on and read information from the magnetic recording medium,
   wherein the magnetic recording medium includes
   a substrate;
   a magnetic layer including an alloy having an $L1_0$ type crystal structure as a main component thereof;
   a plurality of underlayers arranged between the substrate and the magnetic layer; and
   a barrier layer made of a material having an NaCl structure,
   wherein the plurality of underlayers include at least one crystalline underlayer including Mo as a main component thereof, and at least one of Si and C in a range of 1 mol % to 20 mol % and an oxide in a range of 1 vol % to 50 vol %, and wherein the barrier layer is provided between the magnetic layer and the at least one crystalline underlayer including Mo.

8. The magnetic storage apparatus as claimed in claim 7, wherein the at least one crystalline underlayer including Mo, of the magnetic recording medium, includes one or more elements selected from a group consisting of $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO.

9. The magnetic storage apparatus as claimed in claim 7, wherein the plurality of underlayers of the magnetic recording medium include an orientation control underlayer including Cr or Cr as a main component thereof and having a body centered cubic structure, and the at least one crystalline underlayer including Mo is provided on the orientation control underlayer.

10. The magnetic storage apparatus as claimed in claim 7, wherein the plurality of underlayers of the magnetic recording medium include an orientation control underlayer having a B2 structure, and the at least one crystalline underlayer including Mo is provided on the orientation control underlayer.

11. The magnetic storage apparatus as claimed in claim 7, wherein the barrier layer of the magnetic recording medium is made of one or more compounds selected from a group consisting of MgO, TiO, NiO, TiN, TiC, TaN, HfN, NbN, ZrC, HfC, TaC, and NbC.

12. The magnetic storage apparatus as claimed in claim 7, wherein the magnetic layer of the magnetic recording medium includes an CoPt alloy or an FePt alloy having the $L1_0$ type crystal structure as the main component thereof, and includes one or more materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN.

* * * * *